June 28, 1949.　　　　I. W. SIMPKINS　　　　2,474,283
WHEEL MOUNTING IN VEHICLES
Filed Jan. 2, 1948　　　　　　　　　　　　　　2 Sheets-Sheet 2
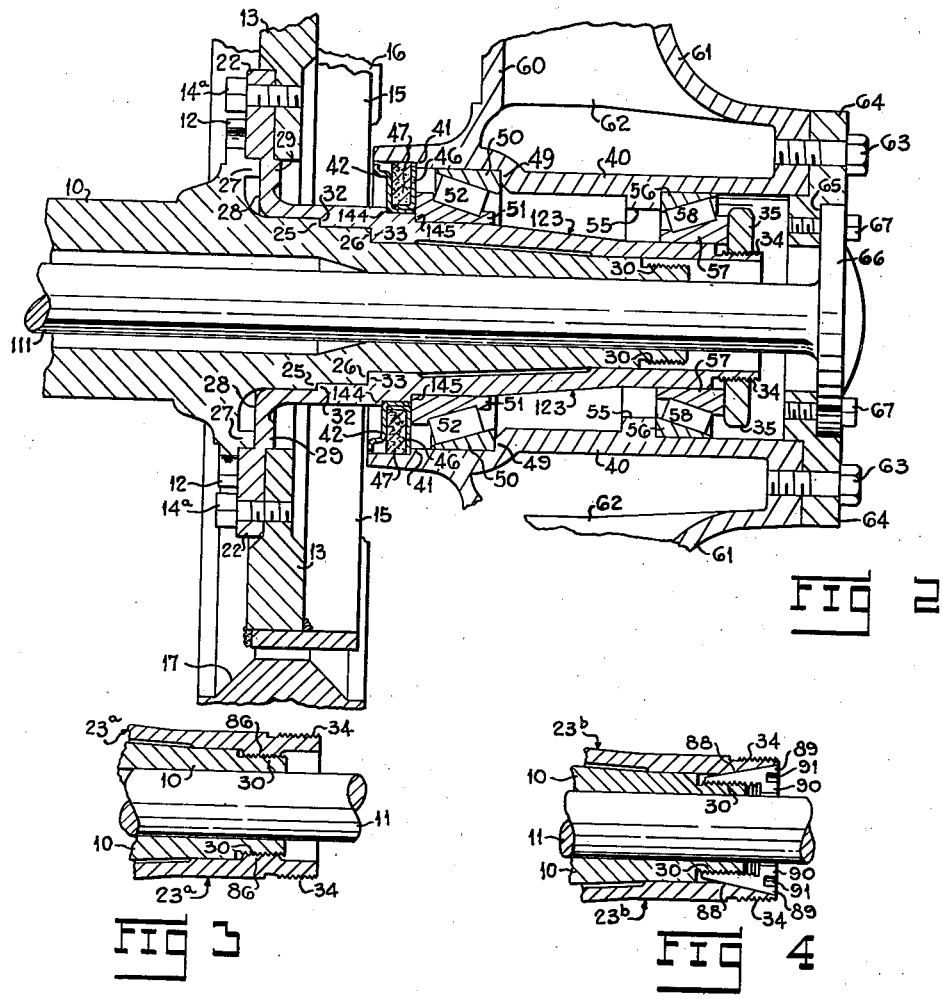
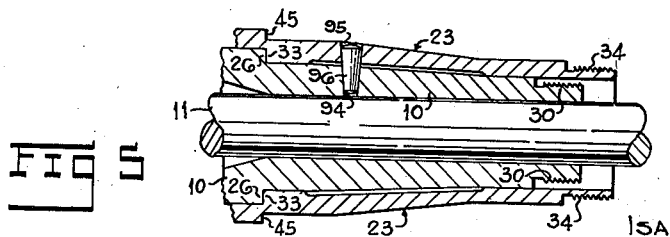
ISAAC W. SIMPKINS,
Inventor.
By　　　　　　　　ATTORNEY Patented June 28, 1949

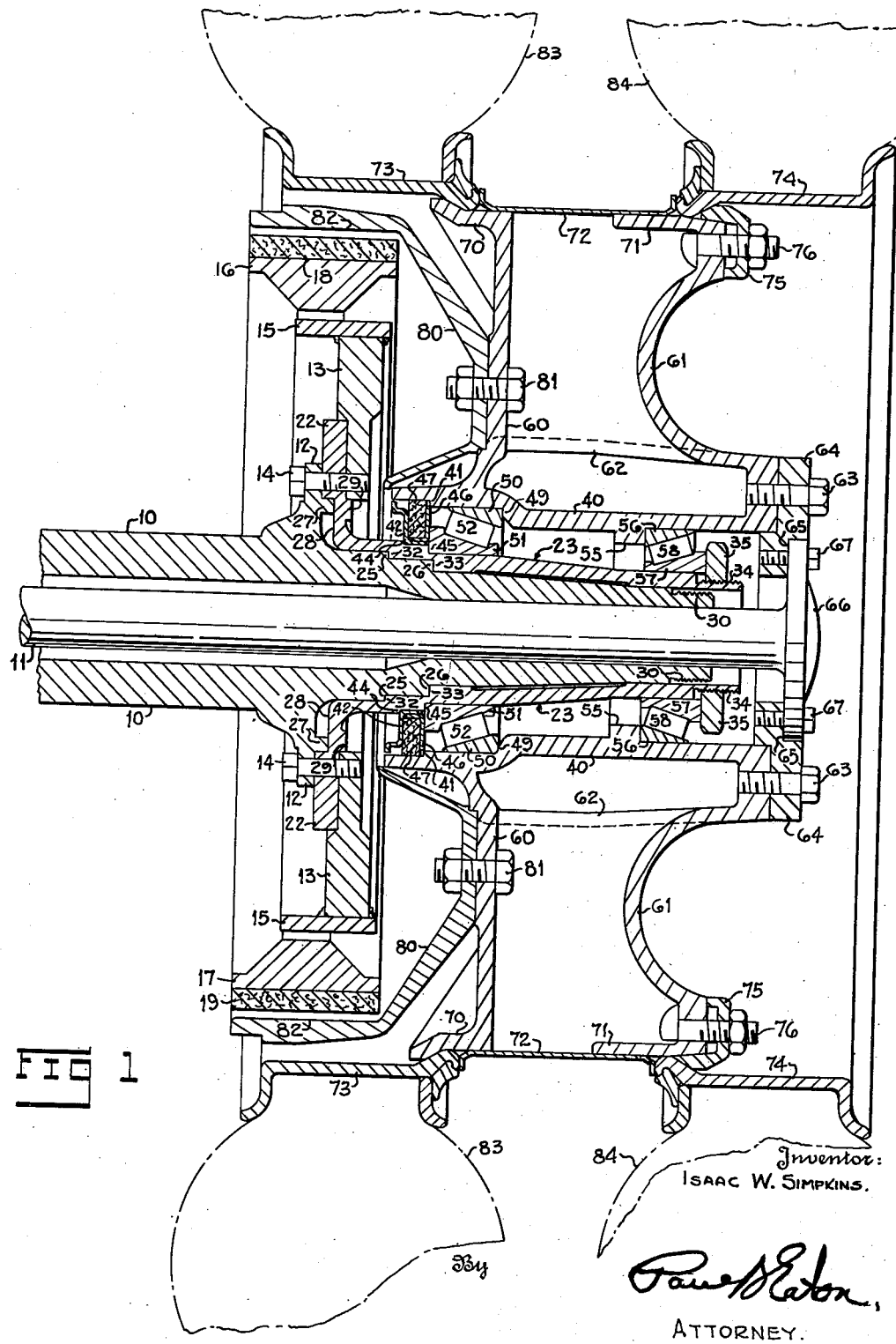

2,474,283

UNITED STATES PATENT OFFICE 2,474,283

WHEEL MOUNTING IN VEHICLES

Isaac W. Simpkins, Charlotte, N. C.

Application January 2, 1948, Serial No. 33

7 Claims. (Cl. 301—128)

1

This invention relates to an improvement in automotive vehicles and more especially to means adapted to be associated with the ends of a rear axle housing for extending the tread. The invention is also applicable to trailers and semi-trailers as well as self-propelled vehicles.

The invention is especially adapted to be associated with the structure shown in patent numbered 2,369,259, of February 13, 1945, though it can be used in association with other types of wheel brakes.

The invention also relates to means adapted to be placed on the ends of an axle housing which not only increase the overall tread of the vehicle, but also permits an increase in the bearing surfaces, whereby oversized bearings can be employed.

It is an object of the present invention to provide means adapted to be associated with the ends of axle housings in automotive vehicles, trailers, semi-trailers and the like in which additional and increased bearing surfaces can be employed to thus enable trucks, trailers and the like to carry a much heavier load than has heretofore been possible, and also whereby the tread of the vehicle can be increased to any desired amount with certain limits.

Some of the objects of the invention having been stated, other objects will appear as the description proceeds when taken in connection with the accompanying drawings, in which Figure 1 is a vertical sectional view through one end of an axle housing of a vehicle and showing the invention associated with the end of the axle housing and with a wheel mounted thereon;

Figure 2 is a vertical sectional view of the central portion of Figure 1 and showing a modified form of the invention;

Figure 3 is a vertical sectional detail through the outer end of the sleeve disposed on the end of the axle housing and showing a modified form of securing the sleeve on the axle housing;

Figure 4 is a view similar to Figure 3, but showing still another modified form of confining the sleeve on the axle housing;

Figure 5 is a longitudinal and vertical sectional view through a portion of the sleeve on the axle housing and showing another means of securing the sleeve in position.

Referring more specifically to the drawings, the numeral 10 indicates one end of an axle housing of a vehicle such as a truck, trailer, semi-trailer, and the like, and in this housing is mounted a conventional axle 11. The housing has ex-

2 tending peripherally thereof and integral therewith an outstanding flange 12 as disclosed in said patent. This flange 12 has an annular member 13 suitably secured thereto by any suitable means such as bolts 14, and to the outer periphery of the annular member 13 is secured by threading or welding an annular brake supporting member 15 to which are pivotally secured, at one of their ends, brake shoes 16 and 17 having brake linings 18 and 19 thereon.

In the present invention, this structure is employed, but instead of having the annular member 13 bolted directly to the annular flange 12, there is disposed between the members 12 and 13 a flanged portion 22 of a sleeve 23 and the bolts 14 slidably penetrate suitable holes in the flanged portion 22 and are threadably imbedded in the annular member 13 securely holding the flanged end of the sleeve in position against the side of the flange 12. The annular portion 22 has an annular projection 29 extending from its right-hand face in Figure 1 whose outer periphery is identical to that of conventional projection 27 and the inner periphery of the annular member 13 is adapted to fit against the annular projection 29.

The axle housing has conventional shoulders 25 and 26 thereon against which the conventional bearings in a vehicle wheel are adapted to fit. The conventional flange 12 has an annular laterally projecting shoulder 27 extending to the right in Figure 1 against which the inner edge of the annular member 13 is normally adapted to fit, but the flanged portion 22 of the sleeve 23 has a recessed portion 28 into which the shoulder 27 of the flange 12 is adapted to fit.

The conventional axle housing at its outer end is threaded as at 30 and normally receives a nut for holding the bearing in position when a wheel of conventional size is employed. The sleeve 23 on its inner surface has a shoulder 32 which fits against the shoulder 25 on the axle housing and it also has a shoulder 33 which fits against the shoulder 26 on the axle housing. On the outer end of the sleeve 23 there is a threaded portion 34 onto which a nut 35 is secured to hold the new and larger type of bearings in position on the periphery of the sleeve 23. A nut similar to this but of smaller inside diameter has heretofore been employed on the threaded portion 30 of the conventional axle housing.

Now, in order to provide a wheel having tires which are larger in cross section than have heretofore been employed on this particular vehicle, I provide a new wheel or a wheel adapted to be used on a larger size vehicle and this has a hub portion 40 whose interior diameter is substantially greater at all points than the outside diameter of the sleeve 23.

The interior of the hub 40 is provided with an annular shoulder 41 and an annular grooved member 42 is disposed against a shoulder 44 and extends out to a shoulder 45 on the exterior of the sleeve 23 and an additional annular member 46 cooperates with the annular member 42 and these two receive a packing gland 47 which fits snugly against the inside periphery of the hub 40 and against the annular member 46.

The hub portion has an interior shoulder 47 and between the shoulder 41 and shoulder 49 is confined a conventional cone type roller bearing having an outer race 50 disposed between the shoulders 41 and 49 and an inner race 51 disposed against the shoulder 45. Between these races 50 and 51 is disposed a plurality of rollers 52.

Immmediately to the right of shoulder 49, the hub 40 is restricted as to inside and outside diameter and an annular projection 55 extends from the inside surface of the hub 40 against which an outer race ring 56 is adapted to fit and an inner race ring 57 is adapted to rest on the outer end of the sleeve 23 and between these race rings 56 and 57 are mounted conventional rollers 58, thus forming what is termed a cone type roller bearing. The nut 35 fits securely against the outer edge of the inner race ring 57 to confine the same in position.

Integral with the hub portion 40 are outwardly projecting disk-like members 60 and 61 which are bound together by radially disposed ribs 62 for holding the portions 60 and 61 is rigid spaced relation to each other. The portion 61 has a plurality of holes therein in its outer surface which has a plurality of bolts 63 threadably mounted therein after penetrating an annular member 64 to hold the annular member 64 in fixed relation to the wheel. The annular member 64 is recessed as at 65 and a disk-like member 66 on the outer end of the axle 11 is penetrated by a plurality of screws 67 which are threadably imbedded in the inner portion of the annular member 64 to thus secure the wheel to the axle.

The peripheries of the portions 60 and 61 are turned substantially laterally as at 70 and 71 on the periphery of which is adapted to rest a suitable annular spacer ring 72. A rim 73 is first inserted from the right to the left in Figure 1 and then the spacer ring 72 is placed in position and then a second rim 74 is placed in the position shown and an annular member 75 is secured to the portion 61 by means of bolts 76 to thus hold the rim in assembled position on the periphery of the wheel.

A conventional brake drum 80 is secured to the portion 60 by any suitable means such as a plurality of bolts 81 and this brake drum has an annular face 82 against which the brake shoes 19 and 18 are employed in a conventional manner. Conventional tires are indicated at 83 and 84, and by the use of this invention, it is possible to move the center of the wheel, that is the center of the annular member 72 farther away from the springs of the vehicle and tires of larger cross section than have heretofore been used in association with this vehicle may be employed without their touching the springs or other portions of the vehicle which would be the case if tires of larger cross section were used on a conventional wheel with which the vehicle is equipped.

In Figure 2 a slightly modified form of the invention is shown and like reference characters will apply to Figure 2. The main difference of the structure of Figure 2 is that it shows that the outer side of the wheel may be further removed from the annular flange 12 than in Figure 1 for increasing the cross-sectional size of the tires as heretofore stated. In this form of the invention, a longer sleeve 123 is employed in which a shoulder 144 is disposed at a greater distance from the annular flange 22 on the sleeve 123 than there is from the shoulder 44 to the flange 22 in Figure 1, whereas a shoulder 145 is disposed the same distance away from the shoulder 144 in Figure 2 as the shoulder 45 is disposed from the shoulder 44 in Figure 1, and receives the same packing gland 47 and associated parts. In Figure 2, of course, it is evident that a longer axle 111 will have to be employed and this will have the flanged portion 66 the same as in Figure 1, otherwise the two structures are identical, the structure is Figure 2 allowing a still larger set of tires to be used than in Figure 1.

In Figure 2 instead of having the bolt 14 extending through suitable holes in the flange 12, the portion 22 has suitable holes therethrough which are penetrated by bolts 14a and which are threadably imbedded in suitable threaded holes in the annular member 13 located at a different point from the threaded holes in the member 13 as shown in Figure 2.

The sleeve 123 in Figure 2 is secured onto the axle housing 10 and this causes the shoulders 32 and 33 to press against the shoulders 25 and 26 by a press fit, or a sweat fit or the annular portion 23 could be welded to the annular flange 12, if desired.

It is also to be noted that in Figure 2 where a longer sleeve 123 is employed, the annular member 15 is moved further toward the end of the axle housing before it is fixed to the annular member 13 as by welding or being threaded thereon.

In Figure 3 is shown a modified form of securing a sleeve 23a onto the outer end of the axle housing 10. The sleeve 23a is identical to the sleeve 23 heretofore described except that it has a restricted portion 86 which is threaded and which is then threaded onto the threaded portion 30 of the axle housing 10 to thus secure the sleeve 23a onto the axle housing 10 and of course, in this form of the invention, the flange 66 and bolts 67 would be employed as shown in Figures 1 and 2.

In Figure 4 another modified form is shown for securing a sleeve 23b onto the axle housing 10 which sleeve is identical in all respects to the sleeve 23 except that its internal bore is tapered outwardly as at 88 and a suitable cone nut 89 internally threaded and having a restricted portion 90 is threaded onto the threads 30 to securely bind the sleeve 23b in position and force its other end against the annular flange 12 and also to cause the shoulders 33 and 32 to firmly fit against the shoulders 25 and 26 on the axle housing. This cone nut can be driven home or removed by any suitable means such as having a plurality of cavities 91 therein for the reception of a spanner wrench and the like.

In Figure 5 another modified form of securing the sleeve 23, 123, 23a, or 23b onto the axle housing is shown in which the sleeve 23 and axle housing 10 have coinciding bores 94 and 95 in which a pin 96 is driven home. This pin can be tapered or straight and if desired, could be threaded and the interior of the bores 94 and 95 likewise could be threaded for receiving a threaded screw 96.

In the drawings and specification there has been set forth a preferred embodiment of the invention, and although specific terms are employed, they are used in a generic and descriptive sense only and not for purposes of limitation, the scope of the invention being defined in the claims.

I claim:

1. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel.

2. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel, and a nut mounted on the outer end of the sleeve for confining the roller bearings in position on said sleeve.

3. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel, and a nut mounted on the outer end of the sleeve for confining the roller bearings in position on said sleeve, the shoulder on the sleeve being disposed nearer to the end of the axle housing than the shoulders on the axle housing.

4. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel, and a nut mounted on the outer end of the sleeve for confining the roller bearings in position on said sleeve, the shoulder on the sleeve being disposed nearer to the end of the axle housing than the shoulders on the axle housing, and means for securing the peripheral flange on the inner end of the sleeve to the flange on the axle housing.

5. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel, and a nut mounted on the outer end of the sleeve for confining the roller bearings in position on said sleeve, means for confining the sleeve on the axle housing comprising a restricted portion on the outer portion of said sleeve and being threaded to threadably engage the threads on the outer end of the axle housing.

6. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral with the outer end thereof and a plurality of screws penetrating the disk-like member on the end of the axle and being threadably mounted in the last-named annular member for securing the axle to the hub member of the wheel, and a nut mounted on the outer end of the sleeve for confining the roller bearings in position on said sleeve, the outer end of the sleeve being tapered outwardly on its interior surface and a cone-shaped annular nut threaded on its interior being adapted to be threadably mounted on the threaded portion on the outer end of the axle housing.

7. In a vehicle having an axle housing provided with a peripheral flange, the exterior of the axle housing being tapered outwardly in a stepped manner to provide one or more shoulders thereon, the axle housing being exteriorly threaded at its outer end, a sleeve member disposed over that portion of the axle housing occurring between the peripheral flange and the end of the axle, and extending beyond the end of the axle housing and having a peripheral flange adapted to be secured to the peripheral flange on the axle housing and being adapted to receive roller bearings on its exterior, a wheel having a hub portion encircling said sleeve and mounted on said roller bearings, the exterior of the hub portion having an annular member secured thereto whose inner diameter is less than the inner diameter of the hub portion, an axle mounted in the axle housing and having a disk-like member integral wtih the outer end thereof and a plurality of screws penetrating the disk-like member on the end of the axle and being threadably mounted in the last-named annular member for securing the axle to the hub portion of the wheel, and a nut mounted on the outer end of the sleeve for confining the roller bearings in position on said sleeve, the axle housing and the sleeve having coinciding holes therein, and securing means mounted in said coinciding holes for securing the sleeve on the axle housing.

ISAAC W. SIMPKINS.

No references cited.